United States Patent [19]

Higuchi et al.

[11] Patent Number: 4,751,976
[45] Date of Patent: Jun. 21, 1988

[54] STEERING SYSTEM FOR AUTOMOTIVE VEHICLE OR THE LIKE

[75] Inventors: Megumu Higuchi, Tokyo; Tokiyoshi Yanai, Yokosuka; Masafumi Nakayama, Yamato, all of Japan

[73] Assignee: Nissan Motor Co., Ltd., Japan

[21] Appl. No.: 820,221

[22] Filed: Jan. 21, 1986

[30] Foreign Application Priority Data

Jan. 21, 1985 [JP] Japan .......................... 60-7368

[51] Int. Cl.[4] .............................................. B62D 5/04
[52] U.S. Cl. ............................... 180/79.1; 74/388 PS; 180/142
[58] Field of Search ..................... 180/79.1, 142, 79; 74/388 PS

[56] References Cited

U.S. PATENT DOCUMENTS

| 3,172,299 | 3/1965 | Musser | 74/388 PS |
| 3,511,104 | 5/1970 | Piat | 74/388 PS |
| 3,983,953 | 10/1976 | Bayle | 180/79.1 |
| 4,556,116 | 12/1985 | O'Neil | 180/79.1 |
| 4,577,716 | 3/1986 | Norton | 180/79.1 |
| 4,658,927 | 4/1987 | Kanazawa | 180/79.1 X |

FOREIGN PATENT DOCUMENTS

| 2951277 | 6/1981 | Fed. Rep. of Germany | 180/79 |
| 2242009 | 3/1975 | France | 180/79.1 |
| 35035 | 3/1977 | Japan | 180/79.1 |
| 76760 | 6/1980 | Japan | 180/79.1 |
| 11966 | 1/1984 | Japan | 180/79.1 |
| 259570 | 12/1985 | Japan | 180/79.1 |
| 1182816 | 3/1970 | United Kingdom | 180/79.1 |

*Primary Examiner*—John J. Love
*Assistant Examiner*—Mitchell J. Hill
*Attorney, Agent, or Firm*—Leydig, Voit & Mayer

[57] ABSTRACT

In order to simplify the construction of a power steering system and simultaneously allow for unassisted steering in the event that the motor or the like of the system malfunctions, the differential gear which establishes the drive connection between the auxiliary motor, the steering input shaft and the steering output shaft is such that when the element of the differential gear which is connected to a variable speed motor is not driven by the motor, an essentially 1:1 drive is established between the steering input and output shafts while at this time the motor driven element is braked only by the friction and other natural resistances which occur in the system. Further, the differential gear is such as to have a relatively low responsiveness to the rotational speed of the motor and thus eliminates the need for a reduction gear between the motor and the differential gear.

10 Claims, 3 Drawing Sheets

STEERING SYSTEM FOR AUTOMOTIVE VEHICLE OR THE LIKE

BACKGROUND OF THE INVENTION

1. Field of the Invention

The present invention relates generally to an automotive vehicle steering system and more specifically to a power assisted type power steering system wherein rotational energy is added directly to a rotatable steering shaft of the system.

2. Description of the Prior Art

FIGS. 1 and 2 show a prior art arrangement (disclosed in Japanese Patent Application First Provisional Publication No. 47-20835) wherein, in order to provide power assistance to the steering and thus reduce the physical force which must be manually applied by the driver, the steering shaft is formed in first and second sections 2, 3 which are interconnected by a differential gear 4. A motor (not shown) is connected to the differential gear 4 and arranged to selectively energizable to add rotational energy to the output section 3 of the divided steering shaft.

However, this arrangement has encountered the drawback that it is necessary to provide a reduction gear such as a worm gear arrangement between the motor and the element of the differential gear via which the auxiliary power input is achieved. Viz., in the illustrated arrangement the differential gear 4 takes the form of a planetary gear train wherein the sun gear A is connected to the input section 2 of the steering shaft, the pinion carrier B is connected to the output section 3 of the steering shaft and the ring gear C is connected with the gear 5 driven by worm D. For the sake of discussion let it be assumed that the rotational speeds of the input and output sections 2, 3 of steering shaft are $\omega_I$ and $\omega_o$ while the rotational speed of the ring gear C is $\omega_c$, and that the pitch circle diameters of the of the sun gear A and ring gear C are 'a' and 'c' respectively; then it can be shown that in the case of the FIG. 1 arrangement:

$$\omega_o = \frac{a}{a+c} \omega_I + \frac{c}{a+c} \omega_c \quad (1)$$

while in the case of the FIG. 2 arrangement that:

$$\omega_o = \left(1 + \frac{a}{c}\right)\omega_1 - \frac{a}{c}\omega_c \quad (2)$$

Accordingly, it can be seen that the rotational speed $\omega_o$ of the output section 3 is equal to the sum of $\omega_I$ and $\omega_c$. Viz., the steering ratio is varied according to the $\omega_c$ input. However, with the FIG. 1 arrangement as the planetary gear must be arranged so that 'c' is greater than 'a' then equation 1 becomes $$1 > \frac{c}{a+c} > 0.5$$

This renders the system impractible unless the variation in steering ratio is rendered stable by rendering $\omega_c$ low in value. In order to achieve this the above mentioned worm gear arrangement is utilized. The worm gear D is also useful in that it functions as a brake which renders the ring gear C stationary when the motor is not energized.

However, the provision of this gearing (5, D) causes the system to become heavy and bulky thus causing design difficulties when trying to incorporate such a system into the confines of an automative vehicle.

Further, when the value of $\omega_c$ is zero (viz the motor is off) the ratio of $\omega_I/\omega_o$ is given by a/a+c and since c is greater than a then it can be shown that $a/a+c \gg 1$. Accordingly, in order to allow for the situation wherein the motor stops as in the event of a malfunction, it has been necessary to provide a specially designed steering gear between the output section of the steering shaft and the vehicle wheels. This use of a non-standard gearing of course increases the cost of the device.

On the other hand, in the case of the FIG. 2 device, as will be appreciated from equation 2 in which the coefficient of the control rotation speed $\omega_c$ is $-a/c$, stable steering ration variation can be attained by increasing the diameter of the ring gear, viz., increasing 'c'. However, the ratio of a/c is limited in actual fact to a value of 0.3 and thus this arrangement tend to be subject to a deteriorated steering 'feel' due to the increased mass of the ring gear C. This arrangement requires increased amount of space and again induces the need to use the above mentioned worm gear D.

Further, as the ratio $\omega_I/\omega_o$ between the steering input and output is $$\left(1 + \frac{a}{c}\right) \gg 1$$

it has been necessary in this instance to use a non-standard steering gear also.

SUMMARY OF THE INVENTION

It is an object of the present invention to provide a gearing arrangement for a power steering system wherein rotational energy is added to the steering shaft which is simple, light and compact and which provides an essentially direct steering connection between the steering wheel and the steering gear of the steering system absent power assistance.

In brief, the above object is achieved by an arrangement wherein in order to simplify the construction of a power steering system and simultaneously allow for unassisted steering in the event power of the system malfunctions, the differential gear which establishes the drive connection between the auxiliary motor, the steering input shaft and the steering output shaft is such that, when the element of the differential gear which is connected to a variable speed motor is not driven by the motor, an essentially 1:1 drive is established between the steering input and output shafts while the motor driven element is braked only by the friction and other natural resistances in the system. Further, the differential gear has a relatively low responsiveness to the rotational speed of the motor thus eliminating the need for a reduction gear between the motor and the differential gear.

More specifically, the present invention is an automotive vehicle steering system comprising: a steering input shaft having a steering wheel connected thereto for steerable wheel of the vehicle; a variable speed motor; a differential gear interconnecting the input shaft, the output shaft and the variable speed motor, the differential gear including: an element operatively connected with the motor to be driven by the same; and means operatively connected with the element for: (i) causing one of (a) essentially the same force to be transmitted between the input and output shafts and (b) the input shaft and output shaft to rotate at essentially the same rotational speed when the element is not driven by the motor and for: (ii) causing one of (a) a different force of be transmitted between the input and output shafts and (b) the input and output shafts to rotate at different rotational speeds, when the element is driven by the motor.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
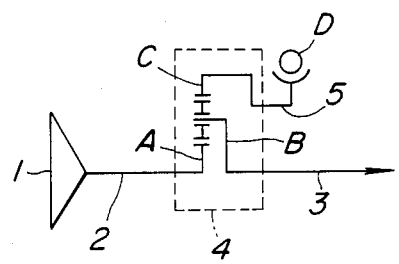
FIGS. 1 and 2 show the prior art arrangements discussed in the opening paragraphs of the instant disclosure.
Figure 2:
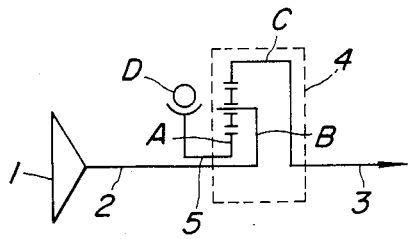
Figure 3:
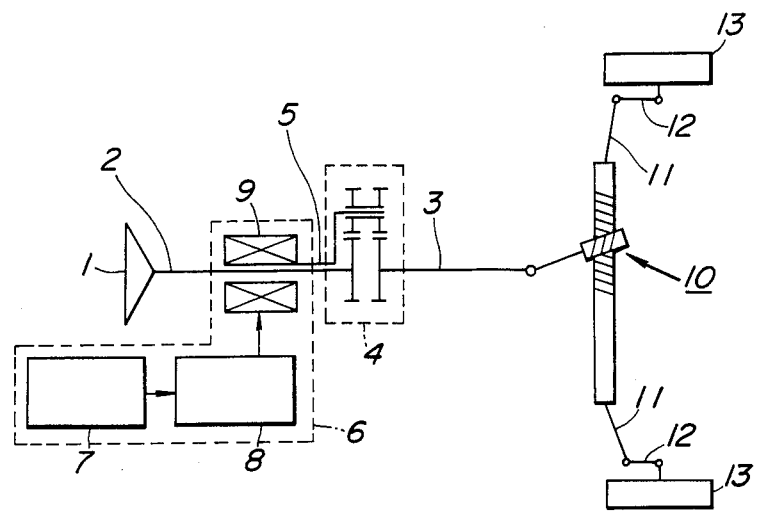
FIG. 3 shows a first embodiment of the present invention.

FIG. 3 shows a first embodiment of the present invention. In this arrangement a steering wheel 1 is operatively connected to a rack and pinon steering arrangement generally denoted by the numeral 10. This device is connected with knuckle arms 12 of the steerable road wheels 13 via side rods 11. As the construction and operation of the latter mentioned steering arrangement is well known no further disclosure relating to this portion of the embodiment will be given for brevity.

As shown, the steering shaft is divided into two sections which shall be referred to as an input shaft 2 and output shaft 3 respectively. Operatively interconnecting the input and output shafts with a source of rotational energy 6 (which in this embodiment includes a variable speed motor 9) is a differential unit 4.

The motor 9 is controlled by a control circuit 8 which is responsive to the output of a sensor or sensors 7 in a manner that the operation and speed of the motor 9 can be varied in response to parameters such as vehicle speed, steering angle, steering speed, vehicle yaw rate, etc.

The differential unit 4 is arranged to include a differential gear in the from of a planetary gear set. In this gear set, when the element which functions as the input for the auxiliary power is not driven to rotate by the motor (viz., either braked or allowed to rotate freely) the rotational speed ratio between the input and output shafts 2, 3 falls in the rage of 0.9 to 1.1 while in instance wherein one of the input or output shafts 2, 3 is held stationary the rotational speed ratio between the other of the input and output shafts and the auxiliary power input shaft 5 is greater than 2.0.

That is, the differential unit 4 is arranged to satisfy the following equation:

$$\omega_o = m \omega_I + n \omega_c \quad (3)$$
$$\text{and}$$
$$1.1 > m > 0.9, 0.45 > n$$

wherein:
$\omega_I$ is the rotational speed of the steering input shaft 2;
$\omega_o$ is the rotational speed of the steering output shaft 3;
$\omega_c$ is the rotational speed of the auxiliary power input element; and
m and n are coefficients.

Figure 4:
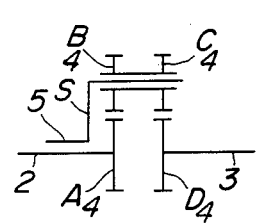
FIGS. 4 and 5 show examples of gear trains which can be used in the arrangement shown in FIG. 3.
Figure 5:
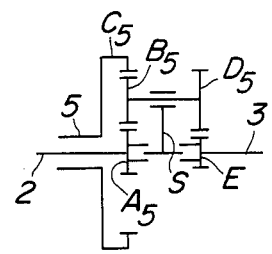

In order to satisfy the aforementioned conditions, the differential unit is comprised of a gear train shown in FIGS. 4 and 5 and in table 1. In this table $\omega_I$, $\omega_o$ and $\omega_c$ are as defined above while Z denotes the number of teeth on each of the gears in group I of Table 1 set forth at the end of the disclosure. In FIG. 4 the auxiliary power input element is pinion gear $C_4$ carried on pinion $S_1$, while in FIG. 5 the auxiliary power input element is ring gear $C_5$.

FIG. 4 shows a first possible gear train arrangement (see group I in Table 1) which can be used in the transmission unit shown in FIG. 3. This gear train takes the form of a Fergusson type gear train (sometimes referred to as a Fergusson's 'wonder' gear train) which includes first and second sun gears A, D a carrier S and a pair of pinions B, C. The latter are formed in a manner to be synchronously rotatable and mesh with the sun gears A, D. In this arrangement the sun gears A, D have the same number of teeth and the pinion gears B, C have a different number, or vice versa.

With this structure the speed ratio is expressed as shown in the following expression:

$$\omega_o = \frac{Z_A \cdot Z_C}{Z_B \cdot Z_D} \omega_I + \left(1 - \frac{Z_A \cdot Z_C}{Z_B \cdot Z_D}\right)\omega_c \quad (4)$$

Hence, in order to satisfy equation 3 the number of teeth is determined as follows:

$$1.1 > \frac{Z_A \cdot Z_C}{Z_B \cdot Z_D} > 0.9, \; 0.45 > \left(1 - \frac{Z_A \cdot Z_C}{Z_B \cdot Z_D}\right)$$

For example as shown in Table 1 the above expression is satisfied when:

$Z_B = Z_C = 14$ or $Z_A = Z_D = 14$
$Z_A = 19$         $Z_B = 20$
$Z_D = 20$         $Z_C = 19$

The gear train shown in group II of Table 1 comprises two planetary gear sets while the gear train of group III takes the form of the gear train of group II modified in a manner to include a Fergasson's type gearing arrangement.

These gear trains can be used in the transmission unit of FIG. 3 in the event that the number of teeth of the various gears are selected in accordance with the examples shown in Table 1.

In operation, when the driver rotates the steering wheel to steer the vehicle, the torque applied to the steering wheel 1 is transmitted via steering input shaft 2 to the transmission unit. Simultaneously, the sensor arrangement denoted by the numeral 7 outputs a signal indicative of the assistance required. This signal is applied to the motor 9 in a manner to energize the same and cause the auxiliary power input element of the transmission unit to be rotated at a speed which is derived in accordance with equation 3 set forth above. The inputs from the driver and the motor thus combine in such a manner to steer the vehicle wheels 13 with minimum driver fatigue.

Further, with the above described arrangements, in the event that the power assistance system malfunctions the driver is able to control the vehicle due to the near 1:1 to ratio which occurs in the absence of input from motor 9.

It should be noted that, as the responsiveness of the above described gear trains to the rotational speed of the auxiliary input element is low, it is possible to connect a variable speed motor directly to the auxiliary power input element without a reduction gear. Further, when the motor is not energized, rotation of the auxiliary input element tends to be suppressed by internal loss (friction between the bearings and various gears) and thus a brake to hold the element stationary is not required.

Figure 6:
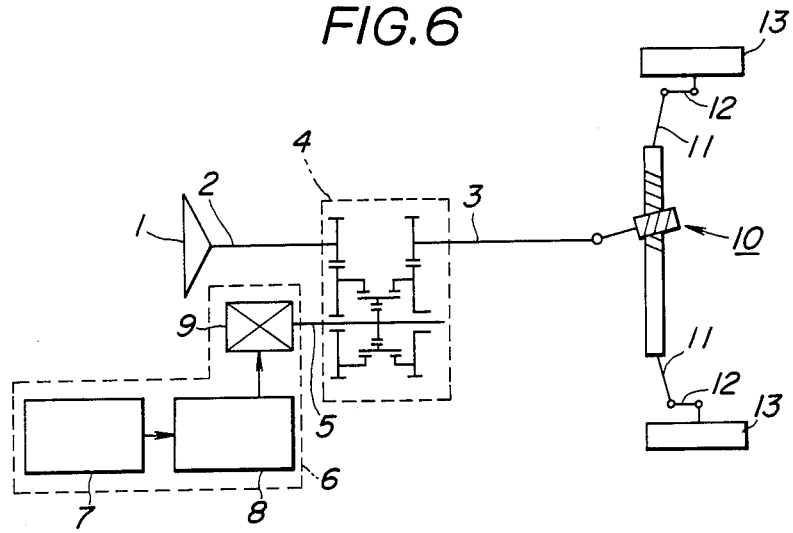
FIG. 6 shows a second embodiment of the present invention.

FIG. 6 shows a second embodiment of the present invention. This embodiment features the arrangement wherein the steering input shaft 2 and the auxiliary power input shaft 5 are offset from one another as different from the coaxial arrangement of the first embodiment. The gear train of the transmission unit is selected in accordance with equation 3 and the relationships set forth in Table 2 (found at the end of the specification).

Figure 7:
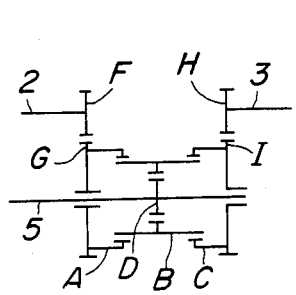
FIGS. 7 to 9 show examples of gear trains which can be used in the FIG. 6 arrangement.
Figure 8:
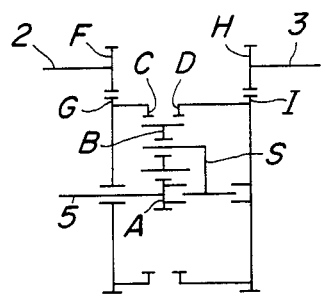
Figure 9:
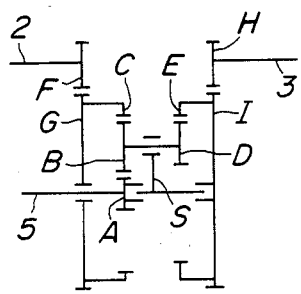

FIGS. 7 to 9 show examples of the gear trains which can be used in the second embodiment.

The gear train shown in group IV of Table 2 (Viz., the arrangement of FIG. 7) utilizes a harmonic drive wherein a wave generator D consists of an overal shaped cam provided with ball bearings at the periphery thereof; a rigid circular spline A having a predetermined number of teeth along the inner periphery thereof; and a flexible spline B which is meshed with the circular spline A and which is formed at the outer periphery thereof with predetermined number of teeth which exceeds that of the rigid circular spline by 2. A second circular spline C is also meshed with one circumferential end of the flexible spline B. Circular spline C has the same number of teeth formed thereon as circular spline A thus providing a high speed reduction ratio.

Circular spline A is formed integrally with a gear G which meshes with a gear F provided on the steering input shaft 2. Circular spline C is integrally formed with a gear I which meshes with a gear H provided on the steering output shaft. Gears G and I and gears F and H have respectively the same number of teeth.

As will be appreciated, in this embodiment the wave generator D serves as the input for the auxiliary power source (motor 9).

The speed ratio of the above gear train is given as follows:

$$\omega_0 = \frac{R}{1+R} \omega_I \pm \frac{1}{1+R} \frac{Z_G}{Z_F} \omega_c \quad (5)$$

where $$R = \frac{Z_B}{Z_A - Z_B}$$

Thus, in order to satisfy equation 3 the number of teeth on the gears are determined as follows:

$$1.1 > \frac{R}{1+R} > 0.9, \quad 0.45 > \frac{1}{1+R} \frac{Z_G}{Z_F}$$

For examaple the above equation is satisfied when $Z_A = 82$, $Z_B = 80$, and $Z_G/Z_F = Z_I/Z_H = 2$.

The gear train shown in group V in Table 2 is obtained by modifying the sun gear and the pinion gears of the planetary gear train in accordance with Fergusson's gear train principle while the gear train defined in group VI is constituted by a combination of two gear planetary gear sets. In these arrangements also the gears F and H, G and I have respectively the same number of teeth.

It will be noted that in the above embodiment the auxiliary power input shaft 5 is offset from the coaxially arranged steering input and output shafts 2, 3 thus increasing the number of design possibilities available when posed with the task of designing an automotive vehicle or the like.

As will be apparent from equation 5 since the coefficient of the differential input is adjustable by determining how to set $Z_G/Z_F (= Z_I/Z_H)$ independently of the coefficient of the steering input, it becomes possible to permit the variable speed motor to operate only in its best performance zones thus adding to the ease with which a given particular system can be designed.

TABLE 1

| Group | Arrangement | Speed Ratio | No. of Teeth | Resulting Speed Ratio |
|---|---|---|---|---|
| (I) | FIG. 4 | $\omega_0 = \frac{Z_A \cdot Z_c}{Z_B \cdot Z_D} \omega_I + \left(1 - \frac{Z_A \cdot Z_c}{Z_B \cdot Z_D}\right) \omega_c$ | $Z_B = Z_C = 14$<br>$Z_A = 19$<br>$Z_D = 20$<br>$Z_A = Z_D = 14$<br>$Z_B = 20$<br>$Z_c = 19$ | $\omega_0 = 0.95 \times \omega_I + 0.05 \times \omega_0$ |
| (II) | FIG. 5 | $\omega_0 = \frac{1 + i_o}{1 + i} \omega_I + \frac{i - i_o}{1 + i} \omega_c$<br><br>where $i = \frac{Z_c}{Z_A}$, $i_o = \frac{Z_C \cdot Z_D}{Z_B \cdot Z_E}$<br><br>and $Z_c = Z_B = Z_A + Z_B$<br>and $Z_A + Z_B = Z_D + Z_E$ | $Z_A = 18$<br>$Z_B = 18$<br>$Z_C = 54$<br>$Z_D = 19$<br>$Z_E = 17$ | $i = 3, i_o = 3.358$<br>$\therefore \omega_0 = 1.09 \times \omega_I + 0.09 \times \omega_c$ |

TABLE 1-continued

| Group | Arrangement | Speed Ratio | No. of Teeth | Resulting Speed Ratio |
| --- | --- | --- | --- | --- |
| (III) | FIG. 5 | $Z_A + Z_B \neq Z_D + Z_E$ with the exception of the above as per group (II) | $Z_A = 12$<br>$Z_B = 12$<br>$Z_C = 36$<br>$Z_D = 18$<br>$Z_E = 12$ | $i = 3$, $i_o = 3.25$<br>$\therefore \omega_o = 1.06 \times \omega_I + 0.06 \times \omega_C$ |

TABLE 2

| Group | Arrangement | Speed Ratio | No. of Teeth | Resulting Speed Ratio |
| --- | --- | --- | --- | --- |
| (IV) | FIG. 7 | $\omega_o = \frac{R}{1+R} \omega_I \pm \frac{1}{R+1} \frac{Z_G}{Z_F} \omega_E$<br>$R = \frac{Z_B}{Z_C - Z_B}$<br>$Z_C = Z_B + 2 \quad Z_B = Z_C$ | $Z_A = 80$<br>$Z_B = 80$<br>$Z_O = 82$<br>$\frac{Z_G}{Z_F} = \frac{Z_I}{Z_H} = 2$ | $R = 40$<br>$\omega_o = 0.976 \omega_I \pm 0.0488 \omega_E$ |
| (V) | FIG. 8 | $\omega_o = \frac{1+i_o}{i+i_o} \omega_I - \frac{1+i}{i+i_o} \frac{Z_G}{Z_F} \omega_C$<br>where $i = \frac{Z_D}{Z_C}$, $i_o = \frac{Z_D}{Z_A}$<br>and $Z_C - Z_B = Z_B + Z_A$<br>and $Z_F = Z_H$, $Z_G = Z_I$ | $Z_A = 9$<br>$Z_B = 9$<br>$Z_C = 27$<br>$Z_D = 26$<br>$\frac{Z_G}{Z_F} = \frac{Z_I}{Z_H} = 3$ | $i = 0.968$, $i_o = 2.889$<br>$\therefore \omega_o = 1.010 \times \omega_I - 0.029 \times \omega_C$ |
| (VI) | FIG. 9 | $\omega_o = \frac{1+i_o}{i+i_o} \omega_I - \frac{1-i}{1-i_o} \frac{Z_G}{Z_F} \omega_C$<br>where $i = \frac{Z_A \cdot Z_B}{Z_C \cdot Z_D}$, $i_o = \frac{Z_B \cdot Z_E}{Z_A \cdot Z_D}$<br>and $Z_C - Z_B = Z_B + Z_A$<br>$Z_A + Z_B = Z_E - Z_D$<br>and $Z_F = Z_H$, $Z_G = Z_I$ | $Z_A = 6$<br>$Z_B = 12$<br>$Z_C = 80$<br>$Z_D = 9$<br>$Z_E = 27$<br>$\frac{Z_G}{Z_F} = \frac{Z_I}{Z_H} = 1.5$ | $i = 1.2$, $i_o = 6$<br>$\therefore \omega_o = 0.9722 \times \omega_I + 0.04167 \times \omega_C$ |

What is claimed is:

1. In an automotive vehicle a steering system comprising:

a steering input shaft, said steering input shaft having a steering wheel connected thereto for inducing rotation thereof;

an output shaft, said output shaft being operatively connected with a steerable wheel of the vehicle;

a variable speed motor, said variable speed motor having an output shaft;

a differential gear interconnecting said input shaft, said output shaft and said variable speed motor, said differential gear including:

an element which is directly connected with the output shaft of said motor to be driven by the same; and means operatively connected with said element for:
   (i) causing one of (a) essentially the same force to be transmitted between the input and output shafts and (b) the input shaft and the output shaft to rotate at essentially the same rotational speed when said element is not driven by said motor and for:
   (ii) causing one of (a) a different force to be transmitted between said input and output shafts and (b) said input and output shafts to rotate at different rotational speeds when said element is driven by said motor.

2. In an automotive vehicle a steering system comprising:

an input shaft, said input shaft being operatively connected to a steering wheel, an output shaft, said output shaft being operatively connected with a steerable wheel of the vehicle;

a variable speed motor, said motor having a drive shaft;

a differential gear interconnecting said input shaft, said output shaft and the drive shaft of said motor, said differential gear including:

(a) an element connected with the drive shaft of said motor so as to be rotatable at the same rotational speed as the drive shaft; and (b) means operatively connected with said element for;
   (i) causing one of (a) essentially the same force to be transmitted between said input and output shafts and (b) the input shaft and output shaft to rotate at essentially the same rotational speed when said element is not rotatably driven by said motor and for:
   (ii) causing one of (a) a different force to be transmitted between said input and output shafts and (b) said input and output shafts to rotate at different rotational speeds when said element is rotatably driven by said motor, said operatively connecting means including a planetary gear train having:

first and second sun gears connected to said input and output shafts, respectively, a carrier on which first and second sets of pinion gears are supported, said first and second sets of pinion gears meshing with said first and second sun gears, respectively.

3. A steering system as claimed in claim 2, wherein the number of teeth on said first and second sun gears are the same and the number of teeth on said first and second sets of pinion gears are different.

4. A steering system as claimed in claim 2, wherein the number of teeth on said first and second sun gears is different and the number of teeth on said first and second sets of pinion gears is the same.

5. In an automotive vehicle
a steering system comprising:
an input shaft, said input shaft being operatively connected to a steering wheel;
an output shaft, said output shaft being operatively connected with a steerable wheel of the vehicle;
a variable speed motor, said motor having a drive shaft;
a differential gear interconnecting said input shaft, said output shaft and the drive shaft of said motor, said differential gear including:
  (a) an element connected with the drive shaft of said motor so as to be rotatable at the same rotational speed as the drive shaft; and
  (b) means operatively connected with said element for:
    (i) causing one of (a) essentially the same force to be transmitted between said input and output shafts and (b) the input shaft and output shaft to rotate at essentially the same rotational speed when said element is not rotatably driven by said motor and for:
    (ii) causing one of (a) a different force to be transmitted between said input and output shafts and (b) said input and output shafts to rotate at different rotational speeds when said element is rotatably driven by said motor,
said operatively connecting means including a planetary gear train having:
first and second sun gears connected to said input and output shafts, respectively,
a carrier on which first and second sets of pinion gears are supported, said first and second sets of pinion gears meshing with said first and second sun gears, respectively,
a ring gear to mesh with said first set of pinion gears.

6. A steering system as claimed in claim 5 wherein the number of teeth on said first and second sun gears are the same and the number of teeth on said first and second sets of pinion gears are different.

7. A steering system as claimed in claim 5, wherein the number of teeth on said first and second sun gears is different and the number of teeth on said first and second sets of pinion gears is the same.

8. In an automotive vehicle
a steering system comprising:
an input shaft, said input shaft being operatively connected to a steering wheel;
an output shaft, said output shaft being operatively connected with a steerable wheel of the vehicle;
a variable speed motor, said motor having a drive shaft;
a differential gear interconnecting said input shaft, said output shaft and the drive shaft of said motor, said differential gear including:
  (a) an element connected with the drive shaft of said motor so as to be rotatable at the same rotational speed as the drive shaft; and
  (b) means operatively connected with said element for:
    (i) causing one of (a) essentially the same force to be transmitted between said input and output shafts and (b) the input shaft and output shaft to rotate at essentially the same rotational speed when said element is not rotatably driven by said motor and for:
    (ii) causing one of (a) a different force to be transmitted between said input and output shafts and (b) said input and output shafts to rotate at different rotational speeds when said element is rotatably driven by said motor.

9. A steering system as claimed in claim 8, wherein when said element is not driven by said motor said operatively connecting means operates so that the ratio of one of (a) the force transmitted between said input and output shafts and (b) the rotational speeds of said input and output shaft lies in the range of 0.9 to 1.1 and simultaneously the rotational speed ratio between said input and output shafts and the said element is greater than 2.0.

10. In an automotive vehicle
a steering system comprising:
a steering input shaft, said steering input shaft having a steering wheel connected thereto for inducing rotation thereof;
an output shaft, said output shaft being operatively connected with a steerable wheel of the vehicle;
a variable speed motor, said variable speed motor having an output shaft;
a differential gear interconnecting said input shaft, said output shaft and said variable speed motor, said differential gear including:
an element which is directly connected with the output shaft of said motor to be driven by the same; and
means operatively connected with said element for:
  (i) causing one of (a) essentially the same force to be transmitted between the input and output shafts (b) the input shaft and the output shaft to rotate at essentially the same rotational speed when said element is not driven by said motor and for:
  (ii) causing one of (a) a different force to be transmitted between said input and output shafts and (b) said input and output shafts to rotate at different rotational speeds when said element is driven by said motor,
sensor means responsive to a plurality of vehicle operational parameters for selectively controlling the rotational speed of said variable speed motor.

* * * * *